United States Patent
Böhm

(10) Patent No.: US 6,366,038 B1
(45) Date of Patent: Apr. 2, 2002

(54) METHOD AND CIRCUIT FOR GENERATING A PULSE-WIDTH MODULATED ACTUATING SIGNAL FOR A DIRECT CURRENT ACTUATOR

(75) Inventor: Jürgen Böhm, Oberneisen (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/554,832

(22) PCT Filed: Nov. 20, 1998

(86) PCT No.: PCT/EP98/07468

§ 371 Date: Jul. 19, 2000

§ 102(e) Date: Jul. 19, 2000

(87) PCT Pub. No.: WO99/27640

PCT Pub. Date: Jun. 3, 1999

(30) Foreign Application Priority Data

Nov. 21, 1909 (DE) .......................................... 197 51 603
Apr. 22, 1998 (DE) .......................................... 198 17 891

(51) Int. Cl.$^7$ .............................. H02P 7/00; H02P 3/00; H02P 3/14
(52) U.S. Cl. ....................... 318/254; 318/439; 318/375; 318/376
(58) Field of Search .................... 318/439, 254, 318/138, 376, 375, 722, 139, 721, 268, 599, 432, 717; 388/812, 811; 180/443, 446, 65.3, 65.1; 701/22, 34, 42, 41, 43; 323/282, 285

(56) References Cited

U.S. PATENT DOCUMENTS 3,899,725 A * 8/1975 Plunkett
3,911,340 A * 10/1975 Plunkett
4,461,988 A * 7/1984 Plunkett
4,544,868 A * 10/1985 Murty
4,599,548 A * 7/1986 Schultz
5,017,800 A * 5/1991 Divan
5,260,645 A * 11/1993 Williams et al.

(List continued on next page.)

FOREIGN PATENT DOCUMENTS

| DE | 3817408 | 11/1989 |
|----|---------|---------|
| DE | 3838408 | 5/1990 |
| DE | 4116534 | 12/1991 |
| DE | 4408442 | 9/1995 |
| DE | 4416216 | 11/1995 |
| DE | 4444810 | 6/1996 |
| JP | 4-355689 | * 12/1992 |

*Primary Examiner*—Paul Ip
(74) *Attorney, Agent, or Firm*—Rader, Fishman & Grauer PLLC

(57) ABSTRACT

Electrical direct current actuators, which have a distinct low-pass behavior with respect to the actuating signal, are frequently used in electronic control and regulation devices. Typical examples of such actuators are d.c. motors or electromagnets. In order to minimize the power losses when controlling such electric d.c. actuators, the associated power amplifiers usually are controlled by a pulse-width modulated actuating signal in the kHz frequency. In order to ensure that the actuator also is activated with the predefined actuating signal when there are variations in the supply direct voltage, the calculated actuating signal is multiplied by a scaling factor in a first functional module, with this scaling factor being obtained in another functional module on the basis of the relationship between the actual supply voltage and the nominal supply voltage. This rescaled actuating signal is then fed to the pulse-width modulator instead of the output actuating voltage causing the pulse duty factor to be adapted to the actual supply voltage.

12 Claims, 3 Drawing Sheets

U.S. PATENT DOCUMENTS

| | | | |
|---|---|---|---|
| 5,341,077 A | * | 8/1994 | Chen et al. |
| 5,453,930 A | * | 9/1995 | Imaseki et al. |
| 5,569,995 A | * | 10/1996 | Kusaka et al. |
| 5,664,047 A | * | 9/1997 | Hanson |
| 5,666,035 A | | 9/1997 | Basire et al. |
| 5,703,473 A | * | 12/1997 | Phillips et al. |
| 5,752,209 A | * | 5/1998 | Nishimoto et al. |
| 5,961,190 A | * | 10/1999 | Brandmeier et al. |
| 5,984,042 A | * | 11/1999 | Nishimoto et al. |
| 6,131,057 A | * | 10/2000 | Tamaki et al. |
| 6,222,334 B1 | * | 4/2001 | Tamagawa et al. |
| 6,232,729 B1 | * | 5/2001 | Inoue |
| 6,236,172 B1 | * | 5/2001 | Obara et al. |
| 6,236,179 B1 | * | 5/2001 | Lawler et al. |

* cited by examiner

METHOD AND CIRCUIT FOR GENERATING A PULSE-WIDTH MODULATED ACTUATING SIGNAL FOR A DIRECT CURRENT ACTUATOR

TECHNICAL FIELD

The present invention generally realtes to electric motor control techniques and more particularly relates to a method and circuit arrangement for generating a pulse-width modulated actuating signal for a d.c. actuator.

BACKGROUND OF THE INVENTION

Electrical direct current actuators, which have a distinct low-pass behavior with respect to the electrical or electromagnetic subsystem, are frequently used in electronic control and regulation devices. Typical examples of such actuators are d.c. motors or electromagnets, for example of the kind applied for actuating an electric parking brake or an electrohydraulic pressure generator or for the external control of an electromechanically actuated brake-force booster.

In order to minimize the power losses when controlling such electric d.c. actuators, the associated power amplifiers usually are controlled by a pulse-width modulated actuating signal in the kHz frequency range. The associated pulse-width modulator consists of a saw-tooth voltage generator which generates a saw-tooth shaped signal with the specified, constant kHz frequency and a maximum amplitude that is equal to the value of a reference voltage and a comparator that compares the saw-tooth signal with the value of a continuous actuating signal derived from the control circuit and fluctuating between a maximum and minimum value. When a d.c. motor is the actuator, the actuating signal, for example, is the armature voltage to set the desired torque of the motor. The reference voltage corresponds to the nominal value of the supply voltage; when this is used in a motor vehicle, the supply voltage generally is equal to the battery voltage of the vehicle electric system.

Furthermore, the comparator of the pulse-width modulator is designed in such a way that it supplies a binary switching signal for at least one switch arranged in the d.c. circuit of the actuator when the saw-tooth signal is below the actuating signal and uses this to generate a pulse-width modulated actuating signal with a pulse width representing the value of the continuous actuating signal and a pulse amplitude corresponding to the supply voltage within a specified pulse duty factor. Due to the low-pass behavior for the electric or electromagnetic subsystem of the actuator, a medium continuous actuator current of a specified size for activating the actuator according to the specifications from the control system adjusts itself.

The principle of the mode of functioning of such a pulse-width modulator is shown in FIG. 4. Section A shows the course of the continuous actuating signal $U_A$ in relation to time. When a d.c. motor is the actuator this actuating signal $U_A$, for example, is the armature voltage of the motor. The size of the actuating signal is determined in a superior control module, e.g. a microprocessor, in such a way that the d.c. actuator is activated with the necessary, desired actuating value.

Section B shows the form of the saw-tooth signal with respect to the actuating signal $U_A$, with the maximum amplitude of the saw-tooth signal being equal to the reference voltage ($U_{Ref}$) which—when applied in a motor vehicle—usually corresponds to the battery voltage of the vehicle electric system $U_{Bat,N}$ with the nominal value $U_{Bat,N}$=12 Volt.

The pulse-width modulator generates a binary switching signal for at least one switch arranged in the d.c. circuit of the d.c. actuator, depending on whether the saw-tooth signal lies below or above the actuating signal $U_A$.

FIG. 5 shows two typical actuators and their d.c. circuits, which are operated by the supply voltage, in the example shown by the battery voltage of the motor vehicle. Part A shows a d.c. motor M for a bidirectional movement, for example for actuating an electric parking brake. Four switches S1 to S4 are shown, which symbolically represent the associated power transistors that are controlled by the mentioned switching signal PWM and a negated switching signal PWM.

Part B shows the control of an electromagnet, for example in the external actuation of an electromechanically actuated brake-force booster, by means of switch S that is switched by the mentioned switching signal.

The ON duration $T_{ein}$ and the OFF duration $T_{aus}$ of the switches is shown in Part C of FIG. 4. This diagram shows the pulse-width modulated actuating signal which leads to a medium actuator current (not shown) having the specified size in the d.c. circuits of the actuators due to the mentioned low-pass behavior.

For the derivation, in particular for calculating the continuous actuating signal, as well as for the configuration of the pulse-width modulator it is generally assumed that the supply voltage to be switched by the pulse-width modulator for activating the actuator, in the example the battery voltage of the vehicle electric system $U_{Bat}$, is always constant and corresponds to the nominal value of the battery voltage $U_{Bat,N}$=12 Volt. Thus, the same pulse duty factor $p=T_{ein}/T$ always is obtained for a defined actuating signal $U_A$. In this connection, the time T stands for the period of the saw-tooth signal. Assuming that the supply voltage $U_{Bat}$ that is to be switched corresponds to its nominal value $U_{Bat,N}$, the following correlation then applies for the actuating signal $U_A$:

$$U_A = P \cdot U_{Bat} = P \cdot U_{Bat,N} \tag{1}$$

For determining the pulse duty factor p, especially on a microcontroller, the nominal value of the supply voltage $U_{Bat,N}$ that is to be switched is taken as the basis. If the actually switched supply voltage $U_{Bat}$ does not correspond to its nominal value $U_{Bat,N}$, as was assumed for calculating the pulse duty factor p, then the pulse duty factor p and, hence, the pulse width will remain constant; however, the pulse amplitude will deviate from its nominal value, namely Ubat,N. Due to Gl. (1), therefore, a voltage value $U_A$ deviating from the specified value $U_A$ results in the actuator circuit on average, and the actuator is actually controlled with this.

Consequently, the actuating value of a superior control system is not realized exactly in this case, since the actuator is controlled with a value differing from the actuating signal. This leads to a deterioration of the control quality which becomes more and more serious as the actual supply voltage deviates increasingly from the nominal voltage. In individual cases, the control circuit may not be able to set a specified value or may tend to exhibit instabilities.

The object of the invention is to design the above-mentioned circuit arrangement for generating a specified pulse-width modulated actuating signal for a d.c. actuator in such a way that the pulse duty factor is adapted to the actual value of the supply voltage, wherein such circuit has a pulse-width modulator consisting of a saw-tooth voltage generator that generates a relatively high-frequency saw-tooth signal with a constant frequency and a maximum amplitude that is equal to the value of the supply voltage serving as the reference voltage as well as a comparator, to which the saw-tooth signal and a continuous actuating signal having a predefined size can be applied as input signals and which is designed in such a way that it supplies a first binary switching signal for at least one switch that is arranged in the d.c. circuit of the actuator connected to the supply direct voltage when the saw-tooth voltage is below the actuating signal and it supplies a second negated binary switching signal when the saw-tooth voltage is above the actuating signal and which uses this to generate a pulse-width modulated actuating signal with a pulse width representing the value of the continuous actuating signal and a pulse amplitude corresponding to the supply voltage within a specified pulse duty factor.

This object is achieved by a method according to the invetion in that the actual value of the supply voltage is determined and the pulse duty factor is adapted to the actual value of the supply voltage.

For this purpose, preferably a nominal value of the supply voltage is divided by the actual value of the supply voltage in order to form a scaling factor that is used to rescale the continuous actuating signal.

A suitable circuit arrangement for executing the method is characterized in that a first functional module is provided, which calculates the scaling factor. A second functional module, which is arranged downstream of the first functional module, multiplies the continuous actuating signal by the scaling factor and feeds the result to the pulse-width modulator.

Thus, in the method according to the present invention and the circuit arrangement for executing the method, the actuating signal derived—and in particular calculated— from the control circuit and in particular calculated, is not fed directly to the pulse-width modulator, but this actuating signal is multiplied by a scaling factor before it is. fed to the pulse-width modulator. This resealing of the actuating signal ensures that the pulse duty factor for the required actuating signal is set in such a way that the actuator voltage applied to the actuator by means of the pulse-width modulator always corresponds to the desired value irrespective of the supply voltage that is to be actually switched. This is true both when the actual supply voltage is equal to the nominal voltage and when the supply voltages vary more or less greatly from the nominal voltage.

According to a further embodiment of the invention, the functional modules of the circuit arrangement preferably are formed by program modules of a microprocessor which, as a rule, is contained in the superior control systems anyway.

In another advantageous further embodiment of the invention, the actuating signal is first fed to a limiter that limits the actuating signal in both directions before it is rescaled by multiplying it by the scaling factor.

The method according to the present invention and the circuit arrangement for executing the method preferably are used in electronic systems in motor vehicles. Thus, according to an embodiment of the invention, the actuator preferably is a d.c. motor which, for example, is used for actuating an electric parking brake or an electrohydraulic pressure generator.

According to another embodiment of the invention the actuator is an electromagnet used for the external actuation of an electromechanically actuated brake-force booster in a motor vehicle.

In all these applications in motor vehicles, the supply voltage preferably should be the battery voltage of the vehicle electric system.

DETAILED DESCRIPTION OF THE PREFERRED EMBODIMENTS

Figure 1:
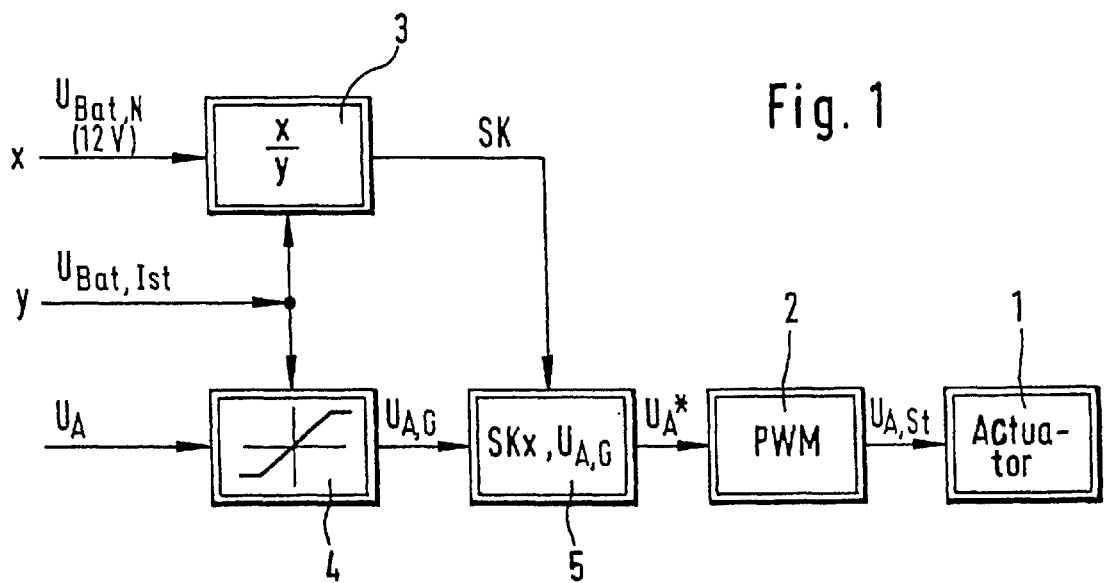
FIG. 1 is a block diagram of the functional modules according to the present invention for resealing the actuating voltage fed to a pulse-width modulator.
Figure 4:
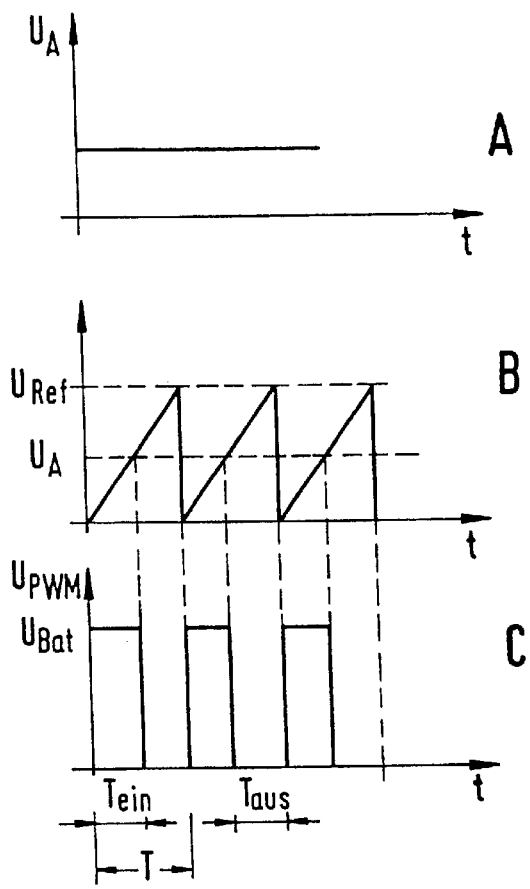
FIGS. 4 and 5 provide the above-mentioned diagrams and circuits for showing the known basic mode of functioning of a pulse-width modulator arrangement.
Figure 5:
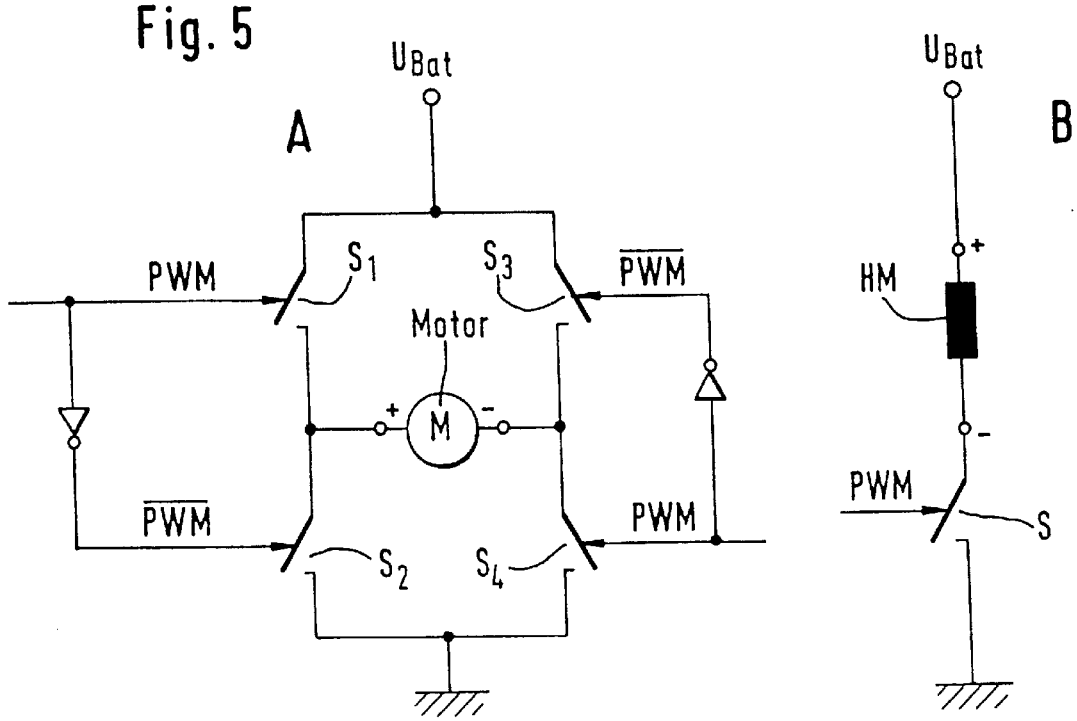

FIG. 1 shows a circuit arrangement for generating an actuating signal $U_{A, St}$ for a d.c. actuator 1, such as the one illustrated in FIG. 5, for example. The circuit arrangement exhibits a pulse-width modulator 2 with a known design, as was already explained with reference to FIG. 4, i.e. it generates a pulse-width modulated signal which contains the information on the desired actuating signal in the pulse width.

In the known embodiment the actuating signal $U_A$ derived from a control circuit or control system is fed directly to the pulse-width modulator 2 and thereby gives rise to the above-mentioned disadvantages when the nominal supply voltage $U_{Bat,N}$ that is taken as the basis for determining the pulse duty factor for the actuating signal does not correspond to the actual supply direct voltage $U_{Bat,Ist}$, whereas in the circuit arrangement according to the present invention a first functional module 3 is provided, to which the value of the actual supply voltage $U_{Bat,N}$ is fed as the input value and this input value is compared with the predefined value for the nominal supply voltage $U_{Bat,N}$ by forming the quotient of the values. Thus, functional module 3 provides as the output value the information on a scaling factor which contains a measure for indicating to what extent the actual supply voltage deviates from the nominal voltage, with the value of the scaling factor being forwarded to a functional module 5, where it is multiplied by an actuating signal $U_A$ that is limited upwards and downwards by an upstream limiter 4. In this connection the actuating signal is determined through a superior control system assuming a constant reference voltage that corresponds to the value of the nominal supply voltage. As the output value of the functional module 5, the scaled actuating signal is then fed to the pulse-width modulator 2 as the input signal. If, as already mentioned above, the actuator is an electromotor, then the actuating signal is the actuator voltage to be fed to the electromotor, and if the actuator is used in a motor vehicle, then the supply voltage usually is the battery voltage of the vehicle electric system.

Figure 2:
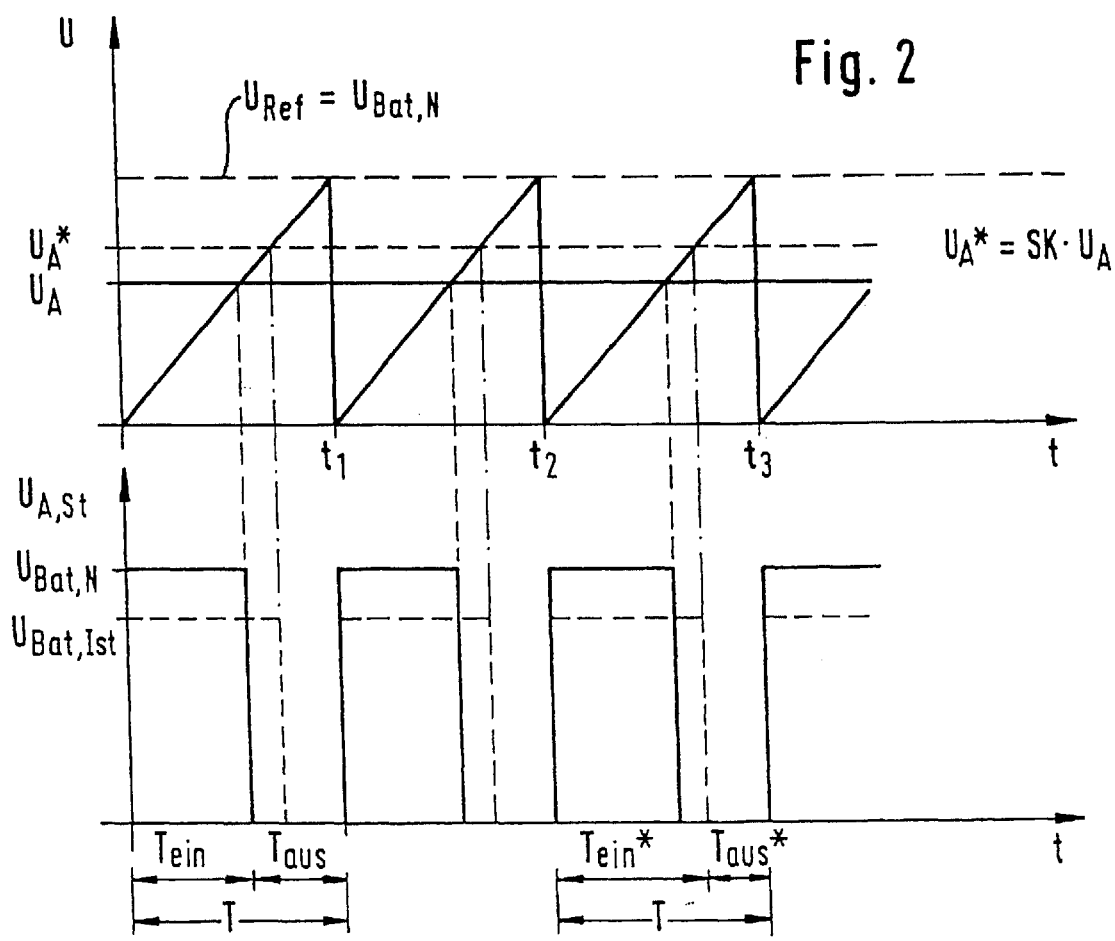
FIG. 2 is a diagram provided to explain the mode of functioning of the invention.

The circuit arrangement according to FIG. 1 ensures that the pulse duty factor of the actuator 1 controlled by the pulse-width modulator 2 is adapted to a supply direct voltage $U_{Bat}$ that changes over time. This effect is to be explained on the basis of the diagram shown in FIG. 2, which corresponds to that in FIG. 4/B. The extended sawtooth curve illustrates the course of a nominal supply voltage $U_{Bat,N}$. At the points of intersection with the actuating signal $U_A$, i.e. t1, t2, and t3, the pulse-width modulator 2 generates a switching signal; the same happens after the maximum amplitude is reached.

If the supply voltage drops to the value $U_{Bat,Ist}$ shown by the dotted line, then it follows for the actuating signal $U_{A,Ist}$ that the pulse amplitude which controls the actuator also drops to the value $U_{Bat,Ist}$, while the pulse duty factor remains unchanged. Thus, instead of the desired actuating signal $U_A$, a signal reduced by the factor SK is fed to the actuator. To ensure that the desired actuating signal $U_A$ also is fed to the actuator when the value deviates from the nominal value of the supply voltage, the desired actuating signal $U_A$ has to be rescaled into an actuating signal $U_A$ by multiplying it by the scaling factor SK in the functional module 5 in FIG. 1. On the basis of FIG. 2, it becomes evident that this causes the pulse duty factor p to increase according to the reduced supply voltage, so that the actuator is then controlled with the desired actuating signal.

Figure 3:
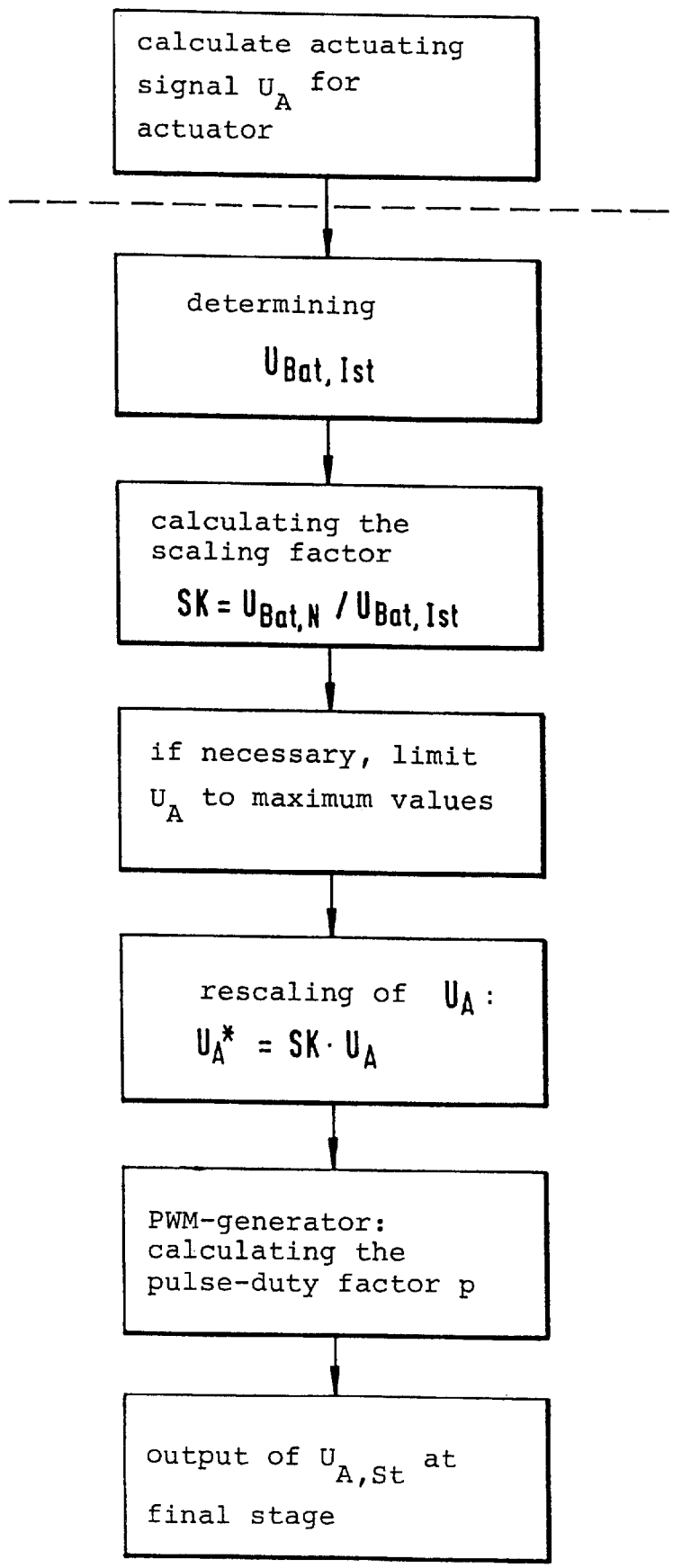
FIG. 3 shows a flow diagram of the resealing of the actuating voltage using as an example an armature voltage for a d.c. motor as actuator.

The functional modules shown in FIG. 1 preferably are program modules of a microprocessor, which is contained in state-of-the-art control systems anyway. The associated flow diagram is shown in FIG. 3, and it can be understood without further comments due to the description of the circuit arrangement shown in FIG. 1.

What is claimed is:

1. A method for generating a pulse-width modulated actuating signal for a direct current actuator, comprising the steps of:

determining an actual value of a supply voltage that corresponds to a battery voltage, dividing a nominal value of the supply voltage by the actual value of the supply voltage in a first functional module in order to form a scaling factor, rescaling the scaling factor in a second functional module, and adapting a pulse duty factor from a saw-tooth wave that is dependant on a continuous actuating signal that is represented by a pulse width and whose amplitude corresponds to the actual value of the supply voltage.

2. A method according to claim 1, further including the step of dividing a nominal value of the supply voltage by the actual value of the supply voltage in order to form a scaling factor, and using the scaling factor to rescale the continuous actuating signal.

3. A method according to claim 1, wherein the first functional module and second functional module are formed by program modules of a microprocessor.

4. A circuit for controlling a direct current actuator, comprising:

a first functional module formed by program modules of a microprocessor, which calculates a scaling factor, a second functional module formed by program modules of the microprocessor, which is located downstream of the first functional module, wherein said second functional module multiplies a continuous actuating signal by the scaling factor, and a pulse-width modulator for generating a pulse-width modulated signal, which is located downstream of the second functional module, wherein said pulse-width modulator feeds the result to the direct current actuator.

5. A circuit arrangement according to claim 4, wherein program modules of a microprocessor form the functional modules.

6. A circuit arrangement according to claim 4, further including a limiter for limiting the actuating signal in both directions and is located upstream of the second functional module.

7. A circuit arrangement according to claim 4, wherein the actuator is a direct current motor.

8. A circuit arrangement according to claim 7, wherein the d.c. motor is used to actuate an electric parking brake.

9. A circuit arrangement according to claim 7, wherein the d.c. motor is used to actuate an electrohydraulic pressure generator.

10. A circuit arrangement according to claim 4, wherein the actuator is an electromagnet.

11. A circuit arrangement according to claim 10, wherein the electromagnet is used for the external control of an electromechanically actuated brake force booster.

12. A circuit arrangement according to claim 4, wherein the value of the supply voltage is the battery voltage of the vehicle electric system.

* * * * *